United States Patent
Hoffmann, Sr.

(10) Patent No.: US 6,317,995 B1
(45) Date of Patent: Nov. 20, 2001

(54) JUNCTION BOX SHIELD AND TEMPLATE FOR USE IN WALLPAPERING

(75) Inventor: Dennis Hoffmann, Sr., McHenry, IL (US)

(73) Assignee: Pro Patch Systems, Inc., McHenry, IL (US)

( * ) Notice: Subject to any disclaimer, the term of this patent is extended or adjusted under 35 U.S.C. 154(b) by 0 days.

(21) Appl. No.: 09/143,761

(22) Filed: Aug. 31, 1998

(51) Int. Cl.[7] ................................................. B26B 29/05
(52) U.S. Cl. ........................... 33/528; 33/566; 33/DIG. 10
(58) Field of Search ............................... 33/528, DIG. 10, 33/562–7; 174/66, 67; 220/3.8, 241, 242

(56) References Cited

U.S. PATENT DOCUMENTS

| | | |
|---|---|---|
| D. 279,860 | 7/1985 | Schwalbe . |
| D. 297,396 | 8/1988 | Schwalbe .............................. D8/14 |
| D. 349,836 | 8/1994 | Maggard . |
| D. 362,602 | 9/1995 | Kusler . |
| 2,788,151 | 4/1957 | Shore . |
| 3,386,071 | 5/1968 | Allen . |
| 3,601,276 | 8/1971 | Culpepper ............................ 220/3.4 |
| 4,057,898 * | 11/1977 | Piosky .................................... 30/289 |
| 4,202,388 * | 5/1980 | Wieting ................................ 144/353 |
| 4,259,785 | 4/1981 | Wortham . |
| 4,353,759 | 10/1982 | Stallings . |
| 4,372,050 | 2/1983 | Eisenhauer . |
| 5,003,128 | 3/1991 | Grondin ................................. 174/67 |
| 5,063,872 | 11/1991 | Maus et al. .......................... 118/213 |
| 5,079,842 * | 1/1992 | Ward ..................................... 30/289 |
| 5,285,014 | 2/1994 | Giulchrist . |
| 5,301,437 * | 4/1994 | Burke ..................................... 33/562 |
| 5,321,206 | 6/1994 | Hibler ..................................... 174/66 |
| 5,375,728 * | 12/1994 | West ..................................... 220/3.8 |
| 5,432,298 | 7/1995 | Thompson . |
| 5,525,755 | 6/1996 | Christensen ........................... 174/67 |
| 5,526,952 | 6/1996 | Green . |
| 5,562,222 | 10/1996 | Jordan et al. . |
| 5,639,991 | 6/1997 | Schuette ................................. 174/58 |
| 5,710,392 | 1/1998 | Bordwell et al. . |
| 5,723,816 | 3/1998 | Neece . |
| 5,902,960 * | 5/1999 | Smith ..................................... 174/66 |
| 6,226,882 * | 5/2001 | Barr ....................................... 33/528 |

FOREIGN PATENT DOCUMENTS

| | | | |
|---|---|---|---|
| 318607 * | 5/1919 | (DE) ..................................... 33/566 |

* cited by examiner

*Primary Examiner*—Andrew H. Hirshfeld
*Assistant Examiner*—R. Alexander Smith
(74) *Attorney, Agent, or Firm*—Marshall, Gerstein, & Borun

(57) ABSTRACT

A combination shield and template for covering an electrical junction box disposed in a wall during the application of wallpaper to the wall is shown and described. The shield/template includes a rectangular plate having an outer periphery disposed in matching registry with or just inside the outer periphery of the junction box. The rear side of the plate faces the junction box and includes at least one aperture for accommodating electrical components therein. The front side of the plate includes a domed cover for covering the aperture or apertures to protect the electrical components accommodated therein from being coated or engaged with wallpaper glue. The front side of the plate further comprises a guide that extends around the periphery of the plate that permits the worker installing the wallpaper to accurately cut the paper after it has been applied to the wall and over the plate which ensures an accurate cut in matching registry with the junction box or disposed just inside the junction box. The presence of the plate prevents the migration of glue or the knife blade inside the junction box.

6 Claims, 1 Drawing Sheet

JUNCTION BOX SHIELD AND TEMPLATE FOR USE IN WALLPAPERING

FIELD OF THE INVENTION

The present invention relates generally to a combination shield and template for covering an electrical junction box during the application of wallpaper to a wall. More specifically, the present invention relates to a combination shield and template which covers the electrical junction box, prevents the introduction of glue or other materials into the box or close to the electrical wires, shields the electrical components from being coated with glue and provides a template for cutting the wallpaper around the periphery of the junction box after the wallpaper has been glued to the wall.

BACKGROUND OF THE INVENTION

When a room has electrical fixtures such as electrical outlets, switches and phone jacks, it is dangerous and unsightly if the electrical components of these fixtures becomes coated with wallpaper glue during a wallpapering operation. Typically, in order to avoid this situation, the worker installing the wallpaper detaches all cover plates and uses masking tape or the like to temporarily cover any exposed electrical components. However, this procedure presents at least two specific problems.

First, as the wallpaper is applied to the wall, glue or the adhesive material may be permitted to enter the electrical junction box and, consequently, come into contact with electrical wiring disposed therein. Because most adhesives are water-based, this presents a shock hazard to the worker installing the wallpaper.

Further, after the wallpaper is applied to the wall and over the junction box, the worker installing the wallpaper does not have a definite idea as to the location of the outer periphery of the junction box. Knowing where the outer periphery of the junction box is important because an ideal cut of the wallpaper would be along the outer periphery of the junction box or just inside the outer periphery of the junction box. In this way, the cover plate will fully cover the cut in the wallpaper because cover plates typically extend beyond the junction box on all sides by one quarter inch or one half inch. By not knowing where the outer periphery of the junction box is, the worker installing the wallpaper is forced to guess and an improper cut may extend beyond the reach of the cover plate thereby exposing a slit or cut in the wallpaper.

Along these same lines, by not knowing where the outer periphery of the junction box is, the worker installing the wallpaper is also unaware of the location of the electrical wiring disposed in the junction box. Consequently, by not knowing where the electrical wiring is, the worker is susceptible to cutting the electrical wiring with the wallpaper cutting knife or blade. Again, this situation presents a substantial shock hazard.

While cover plates are known for use in painting, no such similar cover plates have been provided that fulfill the specific requirements of applying wallpaper. Specifically, no cover plates currently used for painting can adequately serve as a template for cutting wallpaper. Accordingly, there is a need for a combination shield and template for covering electrical junction boxes during the application of wallpaper to a wall which also serves as a template for cutting the wallpaper after the wallpaper is attached to the wall.

SUMMARY OF THE INVENTION

The present invention satisfies the aforenoted needs by providing a combination shield and template for covering an electrical junction box disposed in a wall during the application of wallpaper to the wall. The combination shield and template comprises a rectangular plate that has an outer periphery disposed in matching registry or just inside of the outer periphery of the junction box. The plate further comprises a rear side that faces the junction box and an outwardly facing front side. The plate further comprises at least one aperture for accommodating an electrical component therein, such as a switch or female plug connector. The front side of the plate comprises a domed cover for the aperture which serves to protect the electrical component accommodated in the aperture from wallpaper glue. The domed structure also provides a visual indication to the worker installing the wallpaper as to the location of the junction box.

In an embodiment, the front side of the plate further comprises a guiding groove that extends around the periphery of the plate for guiding a wallpaper cutting blade so that the wallpaper applicator may make an accurate cut of the wallpaper around the cutting blade, either in matching registry with the outer periphery of the junction box or along a line disposed just inside the outer periphery of the junction box.

In an embodiment, the plate is fabricated from an insulating material.

In an embodiment, the plate is fabricated from plastic.

In an embodiment, the plate is fabricated from extruded polyvinyl chloride.

In an embodiment, the plate further comprises at least one hole for accommodating a screw for attaching the plate to the junction box during the wallpapering of the wall.

In an embodiment, the outer periphery of the plate further comprises an outwardly protruding stiffening edge for guiding a wallpaper cutting blade along the outer periphery of the plate.

In an embodiment, the rear side of the plate further comprises at least one inwardly protruding anchor for attaching the plate to a junction box. For example, the inwardly protruding anchor may be accommodated in a female hole normally used for receiving a screw to attach the cover plate to the junction box.

In an embodiment, the rear side of the plate further comprises a plurality of inwardly protruding anchors for attaching the plate to the junction box.

In an embodiment, instead of including the guiding groove disposed in the front side of the plate for guiding the cutting blade around the plate inside the outer periphery of the plate, the plate includes an outwardly protruding stiffening edge for guiding a cutting blade along the outer periphery of the plate.

In an embodiment, the present invention provides a method of wallpapering a wall that has at least one electrical junction box disposed therein. The method includes the steps of removing a cover plate from the junction box, providing a combination shield and template comprising a rectangular plate having an outer periphery disposed in matching registry with or inside of the outer periphery of the junction box. The plate further comprises a rear side that faces the junction box and an outwardly facing front side and at least one aperture for accommodating the electrical component therein. The front side of the plate further comprises a domed cover disposed over the aperture to shield the electrical component accommodated therein from wallpaper glue. The front side of the plate further comprises a guiding groove extending around the plate and inside the outer periphery thereof for guiding the wallpaper cutting blade. The method further includes the steps of attaching the combination shield and template to the junction box with the electrical component accommodated in the aperture and disposed underneath the domed cover. The method further includes the steps of applying glue to a rear side of a wallpaper, attaching the wallpaper to the wall over the junction box and combination shield and template, and cutting the wallpaper by engaging the guiding groove of the plate with the wallpaper cutting blade with the wallpaper disposed therebetween and drawing the blade around a circumference of the groove.

In an embodiment, instead of a guiding groove, a plate is used which includes an outwardly protruding stiffening edge for guiding the wallpaper cutting blade along the outer periphery of the plate. The cutting step then comprises engaging the stiffening edge of the plate with the cutting blade with the wallpaper disposed therebetween and drawing the blade around the outer periphery of the plate.

It is therefore an advantage of the present invention to provide a combination shield and template for covering an electrical junction box during the application of wallpaper to a wall and for further providing a template for cutting the wallpaper after the wallpaper is attached to the wall.

Another advantage of the present invention is that it provides a safer means for applying wallpaper to a wall.

Still another advantage of the present invention is that it provides a means for cutting wallpaper around the periphery of a junction box without the threat of cutting wiring disposed inside the junction box with the cutting blade.

Still another advantage of the present invention is that it prevents the leakage or seepage of wallpaper glue into an electrical junction box.

Other objects and advantages of the present invention will become apparent upon reading the following detailed description and appended claims, and upon reference to the accompanying drawings.

It should be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted. It should be understood, of course, that the invention is not necessarily limited to the particular embodiments illustrated herein.

DETAILED DESCRIPTION OF THE PRESENTLY PREFERRED EMBODIMENTS

Figure 1:
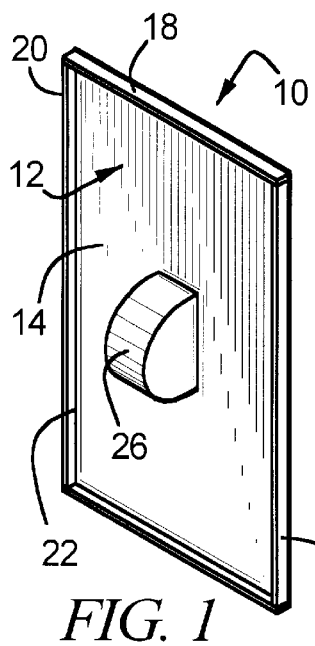
FIG. 1 is a perspective view of a combination shield and template made in accordance with the present invention, specifically made for covering an electrical junction box that accommodates a light switch.
Figure 2:
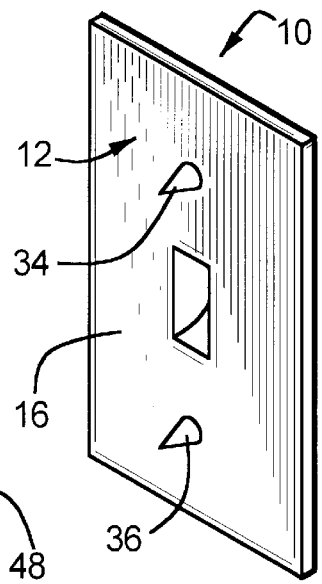
FIG. 2 is a rear perspective view of the combination shield and template shown in FIG. 1.

Turning first to FIG. 1, a combination shield and template 10 is illustrated which includes a plate 12 having a front side 14 and a rear side 16 (see FIG. 2). The plate 12 includes an outer periphery 18 which, in the embodiment shown in FIGS. 1 and 2, includes an outwardly protruding stiffening edge or bead 20. The edge 20, in combination with the front side 14 of the plate 12, define a guiding groove or slot 22 that extends around the outer periphery of the plate 12. As shown below with respect to FIGS. 4 and 5, the groove 22 can serve as a guiding groove or slot for guiding a cutting blade 24 (see FIGS. 4 and 5) around the outer periphery 18 of the plate 12.

Figure 5:
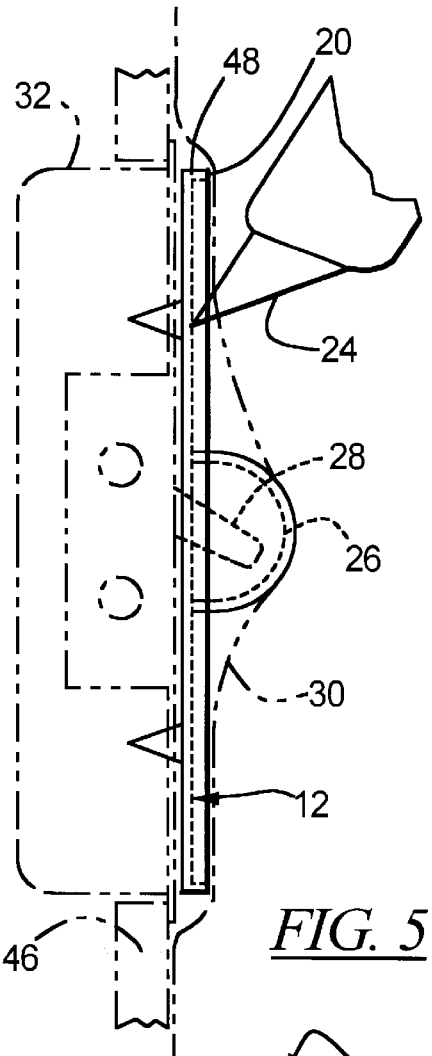
FIG. 5 is a side plan view of the cutting blade, combination shield and template, junction box and light switch shown in FIG. 4.

Still referring to FIG. 1, the front side 14 of the plate 12 also includes a domed cover 26 which, in this case, is fixedly attached to the front side 14 of the plate 12. The cover 26, as best shown in FIG. 5, protects a light switch 28 from being engaged by wallpaper 30 that has been coated with glue or adhesive. Further, the domed or rounded structure of the cover 26 enables the plate 12 to be attached to the junction box 32 when the switch is disposed in the down position shown in FIG. 5, or in an up position (not shown).

Figure 4:
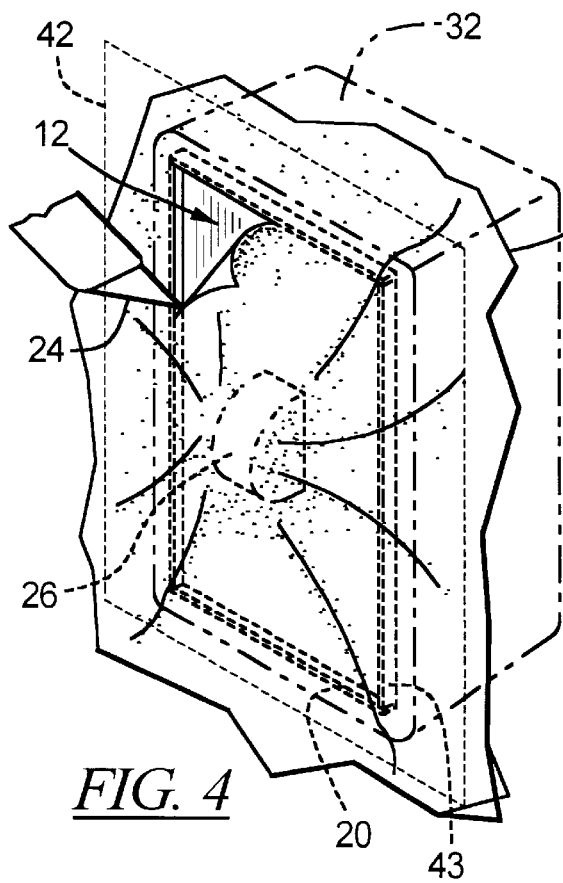
FIG. 4 is a perspective view particularly illustrating the cutting of wallpaper after the wallpaper has been attached to a wall and over a junction box that is equipped with a combination shield and template made in accordance with the present invention.
Figure 3:
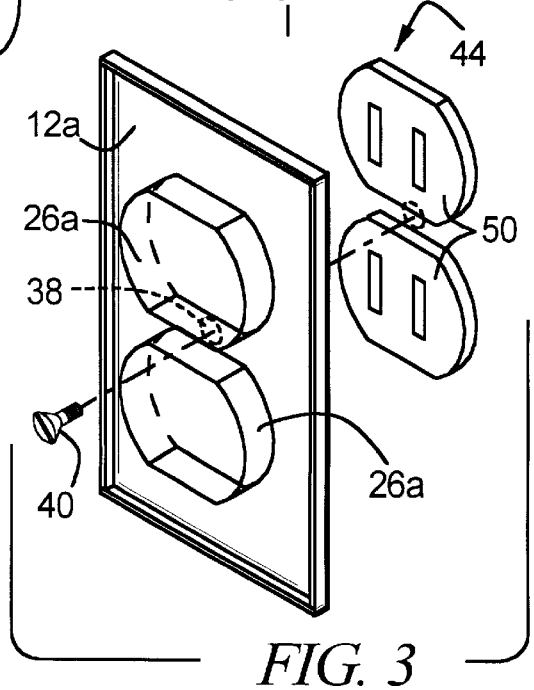
FIG. 3 is a exploded perspective view of a shield and template made in accordance with the present invention as being attached to a junction box [not shown] that accommodates an electrical outlet assembly.

Turning to FIGS. 2 and 3, the plate 12 may be attached to the junction box 32 by way of anchors 34, 36 or, referring to FIG. 3, the plate 12a may include a hole 38 for accommodating a screw 40 that normally attaches the cover plate shown in phantom at 42 in FIG. 4 to the junction box 32 (see FIG. 5). There are advantages to each attachment method. Specifically, the use of anchors 34, 36 is fast and easy and does not require the handling of a small screw. However, it has been found that small screws such as the one shown at 40 in FIG. 3 can become lost during painting and wallpapering operations and therefore the use of the screw 40 as shown in FIG. 3 to attach the plate 12a to the outlet 44 ensures that the screw 40 is not lost or misplaced.

Turning to FIGS. 4 and 5, after the plate 12 is mounted to the junction box 32, glue may be applied to the rear side of the wallpaper 30 and the paper 30 applied to the wall 46 and over the junction box 32 and plate 12. Due to the presence of the domed cover 26, a bulge will appear in the paper 30 thereby easily identifying the location of the plate 12 to the worker installing the wallpaper. The worker installing the wallpaper will then take a blade 24 and cut either along the guiding groove 22 discussed above with respect to FIG. 1 or along the side edge 48 of the stiffening edge 20 of the plate 12. The preferred method is to use the inside groove 22 because the presence of the stiffening edge 20 prevents the blade from slipping or migrating outward thereby making a cut or tear in the paper 30 that would not be covered by the cover plate 42. However, some workers installing the wallpaper may prefer to use the outside edge surface 48 instead. Either way, as clearly shown in FIGS. 4 and 5, the plate 12 does not permit the blade 24 to engage any wires or extend well into the interior of the junction box 32 where wires or electrical components would be present. Thus, the plate 12 clearly reduces any shock hazard associated with the cutting of the paper 30 with a blade 24. Similarly, the plates 12 and 12a as shown in FIGS. 4 and 5 prevent the migration of glue or adhesive from entering into a junction box, which would also present a shock hazard. Further, the domed structures 26 (FIGS. 1, 4 and 5) and 26a (FIG. 3) protect the electrical components such as the switch 28 or the sockets 50 from being coated with glue or adhesive.

From the above description, it is apparent that the advantages and objects of the present invention have been achieved. While only certain embodiments have been set forth, alternative embodiments and various modifications will be apparent from the above description to one skilled in the art. These and other alternatives are considered equivalents and within the spirit and scope of the present invention.

What is claimed:

1. A method of wallpapering a wall having at least one electrical junction box disposed therein, the junction box having an outer periphery which is covered entirely by a cover plate during normal use and at least one outwardly protruding electrical component, the method comprising the following steps:

removing the cover plate from the junction box;

providing a combination shield and template comprising a rectangular plate having an outer periphery disposed in matching registry with or inside of the outer periphery of the junction box, the plate further comprising a rear side that faces the junction box and an outwardly facing front side and at least one aperture for accommodating the electrical component therein, the front side of the plate comprising a domed cover disposed over the aperture to shield the electrical component accommodated therein from wallpaper glue, the outer periphery comprising an outwardly protruding stiffening edge that extends outward from the front side of the plate, the outwardly protruding stiffening edge comprising an uninterrupted vertical inside wall, a junction of the vertical inside wall and the front side of the plate defining a guiding groove that extends around the plate and inside of the outwardly protruding stiffening edge for guiding a wallpaper cutting blade, attaching the combination shield and template to the junction box with the electrical component accommodated in the aperture and disposed underneath the domed cover, applying glue to a rear side of a piece of wallpaper, attaching the wallpaper to the wall and over the junction box and combination shield and template, cutting the wallpaper by engaging the guiding groove of the plate with the cutting blade with the wallpaper disposed therebetween and drawing the blade around a circumference of the groove.

2. The method of claim 1 wherein the plate is fabricated from an insulating material.

3. The method of claim 1 wherein the plate is fabricated from extruded polyvinyl chloride.

4. The method of claim 1 wherein the plate further comprises at least one hole for accommodating a screw for attaching the plate to the electrical component disposed inside of the junction box during the wallpapering of the wall and the attaching step further comprises inserting a screw through the hole and into a mating female hole in the electrical component.

5. The method of claim 1 wherein the rear side of the plate further comprises at least one inwardly protruding anchor for attaching the plate to the electrical component disposed inside of the junction box and the attaching step further comprises inserting the anchor into a female hole disposed in the electrical component.

6. A method of wallpapering a wall having at least one electrical junction box disposed therein, the junction box having an outer periphery and at least one outwardly protruding electrical component, the method comprising the following steps:

removing a cover plate from the junction box;

providing a combination shield and template comprising a rectangular plate having an outer periphery disposed in matching registry with or inside of the outer periphery of the junction box, the plate further comprising a rear side that faces the junction box and an outwardly facing front side and at least one aperture for accommodating the electrical component therein, the front side of the plate comprising a domed cover disposed over the aperture to shield the electrical component accommodated therein from wallpaper glue, the outer periphery of the plate further comprises an outwardly protruding stiffening edge that extends outward from the front side of the plate, the outwardly protruding stiffening edge comprising an uninterrupted inside vertical wall, a junction of the inside vertical wall and the front side of the plate defining a guiding groove for guiding a wallpaper cutting blade around the plate and inside the outwardly protruding stiffening edge of the plate, attaching the combination shield and template to the junction box with the electrical component accommodated in the aperture and disposed underneath the domed cover, applying glue to a rear side of a piece of wallpaper, attaching the wallpaper to the wall and over the junction box and combination shield and template, cutting the wallpaper by engaging either the stiffening edge or the guiding groove of the plate with the cutting blade with the wallpaper disposed therebetween and drawing the blade around either the outer periphery of the plate or the guiding groove of the plate.

* * * * *